March 17, 1936.　　　　E. ZAHNER　　　　2,034,076
MECHANICAL BLASTER
Filed March 15, 1935　　　2 Sheets-Sheet 1
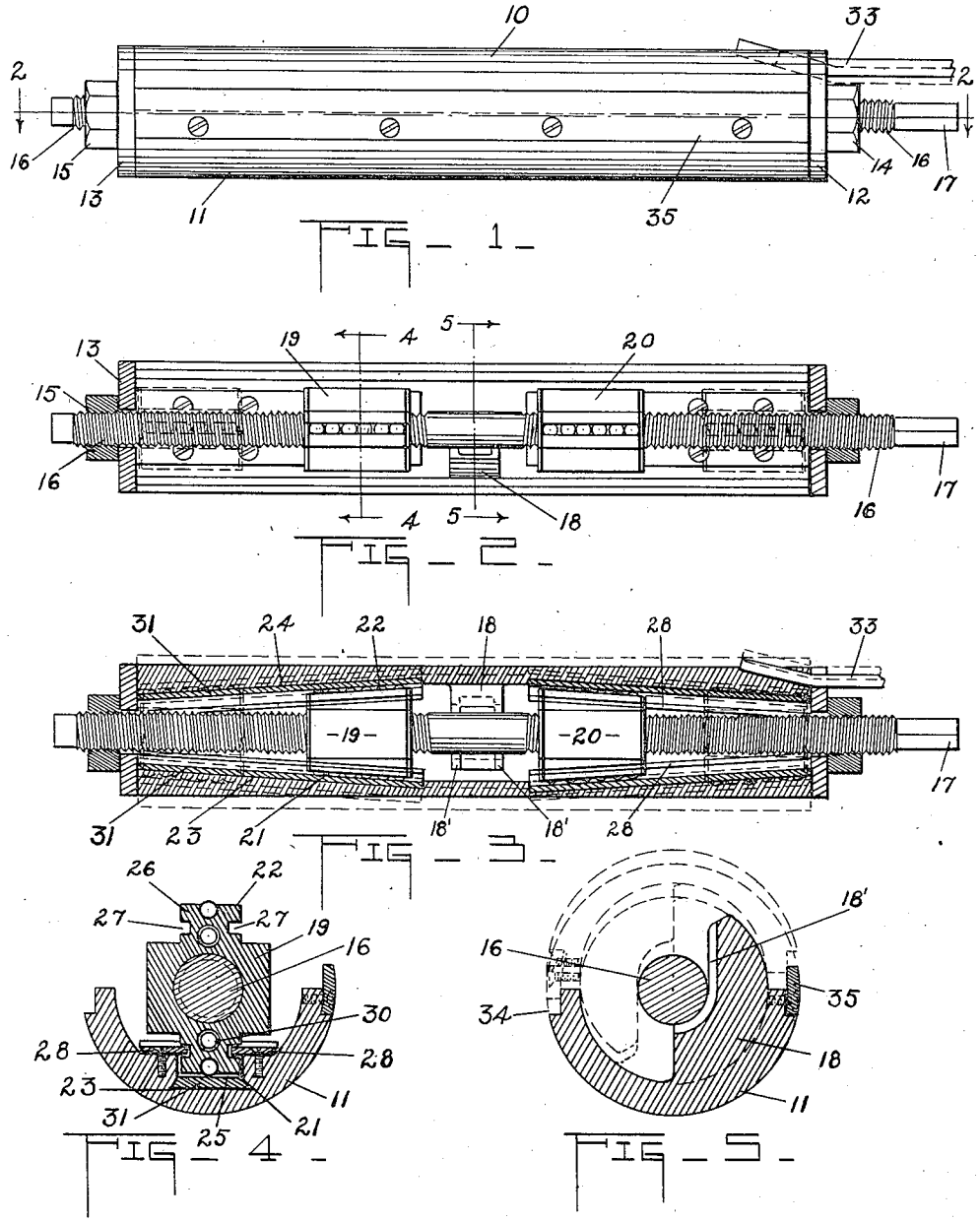

March 17, 1936. E. ZAHNER 2,034,076
MECHANICAL BLASTER
Filed March 15, 1935 2 Sheets-Sheet 2

INVENTOR
Ernest Zahner
BY
Zeff & Zeff
ATTORNEYS

Patented Mar. 17, 1936

2,034,076

UNITED STATES PATENT OFFICE 2,034,076

MECHANICAL BLASTER

Ernest Zahner, East Peoria, Ill.

Application March 15, 1935, Serial No. 11,218

2 Claims. (Cl. 262—12)

This invention has reference to mechanical blasters and has for its principal object to provide a device for use in breaking down coal and the like in mines whereby to avoid the use of explosives commonly employed in such work.

A further object is to provide a device as aforesaid having wedging members disposed between separable shells and means for operating the former within the latter to force the shells apart to produce a separating or splitting action.

An additional object is to provide shells and wedges as aforesaid in which the wedges are adapted to hold the shells together as well as force them apart.

Another object is to provide novel means for reducing friction which would normally oppose easy operation of the device.

A further object lies in the provision of removable wearing parts whereby, by simple replacements the device may be maintained in efficient working condition.

Other objects will appear in the following description and accompanying drawings in which:

Fig. 1 is a side elevational view showing the device as it would appear ready for use;

Fig. 2 is a plan view with the upper shell section removed to show interior parts, taken from line 2—2 in Fig. 1;

Fig. 3 is a sectional elevational view showing parts to be described;

Fig. 4 is a sectional elevational view taken on line 4—4 in Fig. 2;

Fig. 5 is a sectional elevational view taken on line 5—5 in Fig. 2;

Figures 6, 7:
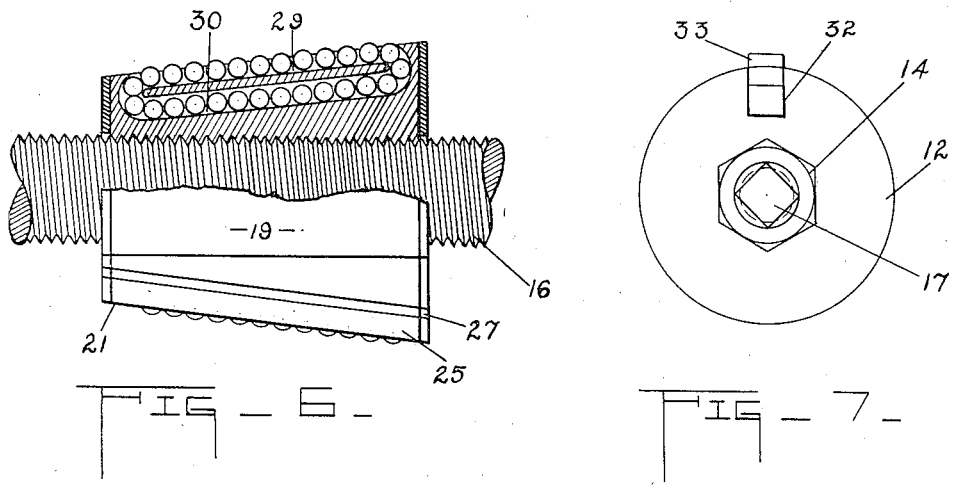
Fig. 6 is a side elevational view showing one of the wedge members with a portion broken away to illustrate details of structure to be explained.
Fig. 7 is an end elevational view taken from the right in Fig. 1.

Referring to the drawings, Fig. 1 discloses my invention as comprising a pair of shell members 10 and 11 which are substantially identical in form, of suitable length and held with their ends in alignment by means of washers 12 and 13 abutted by nuts 14 and 15 which are secured to a shaft 16.

Fig. 2 illustrates that shaft 16 extends longitudinally throughout the length of the shells and terminates at the right hand end in a squared portion 17 suitable for attachment of any desired driving means, not shown.

As indicated in the several views, the outer ends of shaft 16 are threaded in opposite progression and its central portion is left smooth. The central portions of the shells are provided with complementary portions 18 which extend inwardly and are formed to have bearing surfaces 19 disposed upon opposite sides of the shaft.

Referring to Figs. 3 and 4, it will be noted that the oppositely progressive threaded portions of shaft 16 carry head members 19 and 20 which are adapted to move longitudinally of the shaft in opposite directions when the shaft is rotated.

Heads 19 and 20 are fashioned to have converging outer faces 21 and 22 which lie adjacent complementally disposed slide or raceway surfaces 23 and 24.

Heads 19 and 20 are identical in form and the opposing raceways in opposite ends of the shells are therefore identical.

The faces 21 and 22 are formed upon outwardly directed extending portions 25 and 26 of the heads as shown best in Fig. 4. These extensions are provided with grooves 27 on each side and the grooves lie parallel with the surfaces 21 and 22.

Secured to ledge portions of the shells and disposed opposite grooves 27 are overhanging rail members 28. The latter members engage the grooves in slidable relation as shown and are obviously capable of holding the heads and shells in proper relation.

It will now become apparent that the washers 12 have no function other than to hold the shells against longitudinal movement with respect to each other and to shaft 16, and it is to be particularly noted that the shells are held in proper parallel position with respect to the shaft by means of the heads engaged by rails 28 as described, there being no other means of supporting the shells in assembly with the shaft.

As shown best in Figs. 4 and 6, the heads are provided with ball tracks 29 which connect at each end with return ducts 30 whereby continuous series of balls are retained to form an efficient ball bearing means for reducing friction resulting from the heavy pressure developed in expanding the shells.

Inserted in the shell structure, to form facings for raceways 23 already noted, are hardened rails 31 which are made removable. They may be secured in the shell structure by any desired means, and are herein shown as having a gibb form fitting complementary formation in the shell structure.

As shown in Figs. 1 and 7, washer 12 is provided with an opening 32 and opposite this is a similar opening in the body of shell 10, the latter opening being directed toward the outer surface of the shell, as shown.

Disposed in the openings is a square bar 33 the body of which lies parallel the shaft 16 and extends any suitable distance away from the end of the device so as to have its outer end easily accessible.

At its inner end the bar is angulated to conform to the general direction of the openings in which it lies.

Operation of the device is as follows:

With heads 19 and 20 in position toward the center of the shells, as shown in Fig. 3, the shaft 17 may be rotated in a certain direction to propel the heads toward the outer ends, whereby, due to the converging disposition of raceways 23 the shells are gradually forced apart as shown in dotted lines in Fig. 3.

Opposite rotation of the shaft brings about movement of the parts in opposite direction, the shells obviously being forced together during return movement by means of the fastening afforded by rails 28.

Figure 8:
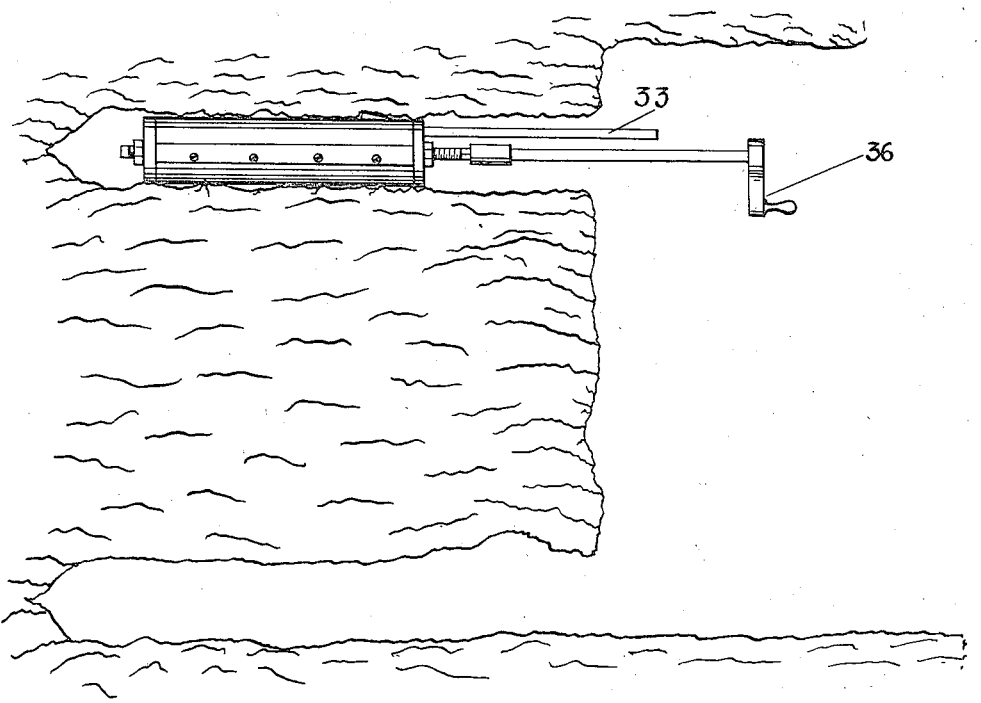
Fig. 8 is an outline view showing the usual arrangement of practical use.

In practical use the device is inserted in a blast hole as indicated in Fig. 8, whereupon the rod 33 is struck so as to propel it forwardly to slide in its openings to force the inner end outwardly as in Fig. 1 to firmly seat it in the upper wall of the hole. In this manner the device is anchored against turning in the hole.

The rod, by reason of its extending to a point outside the hole as shown, also serves as an indicator whereby the operator may know if the device is properly set in the hole.

The device is placed in the hole in contracted condition whereupon, after adjustment of rod 33, the shaft is rotated as by the crank 36 or power means to forcibly separate the shells and thus split the coal in the well known manner.

The ball bearing means provided reduces the otherwise severe friction which it would be necessary to overcome in forcing the shells apart under the conditions of use. In this manner much wear on the moving portions of the apparatus is avoided and the power required to rotate shaft 16 is minimized.

In order to seal the space between the shells, particularly when the same are in separated position, against entrance of extraneous material, I provide recesses 34 disposed longitudinally of the shell sections along the edges thereof.

Upon opposite sides of the shells, strips of material 35 are secured, each shell carrying an oppositely disposed strip which lies in the recess of the opposite shell as shown in Fig. 5. However, lodgement of particles of material between the shells, if such should be present, does not interfere with proper working of the device for the reason that during the contracting movement of the shells substantially the same power or pressure is available, as is the case during expanding movement and thus any material between the members is crushed and rendered incapable of holding the shells apart.

It is to be particularly noted that at no time during operation is the shaft 16 subjected to any serious bending stress, this being due to the novel arrangement whereby the shaft is supported between the shells by means of heads 19 and 20 and the shells are in turn supported upon the heads by the means described.

Thrust forces are substantially absorbed within the shaft and shells in such a manner that washers 12 and 13 are relieved of thrust pressure and thereby the friction opposing outward movement of the shells is minimized.

The foregoing has described an embodiment of my invention. Modifications of structure are obviously possible without alteration of the principle involved. I do not wish to be limited in structure or principle except within the scope of the appended claims.

What I claim is:

1. A device of the class described comprising a pair of semi-circular shells oppositely disposed to form a substantially cylindrical structure adapted to be received in a hole in a vein of coal or the like, means in one of the shells for locking the structure in the hole and for indicating the position thereof in the hole, mechanism attached between the shells capable of forcing the shells apart or forcing the same together and means to operate said mechanism.

2. A device of the class described comprising a pair of semi-circular shells oppositely disposed to form a substantially cylindrical structure, a shaft disposed longitudinally between the shells having a threaded portion, a head member threadedly mounted on the shaft, means preventing longitudinal movement of the shaft with respect to the shells whereby rotation of the shaft is made to cause longitudinal movement of the head with respect to the shells, a removable track member secured on the inner side of each of said shells which tracks lie longitudinally angularly disposed with respect to the axis of said shaft, grooves in the faces of said heads opposite said tracks, an enclosed duct lying parallel each of said grooves between the latter and said shaft and ducts leading from the ends of said grooves into said ducts, rolling members in the grooves forming a series of rolling surfaces between said head and tracks and adapted to roll the length of said grooves, into and through said ducts to the opposite ends of the grooves and again in said grooves over said tracks.

ERNEST ZAHNER.